United States Patent
McDaniel et al.

(10) Patent No.: US 7,112,643 B2
(45) Date of Patent: Sep. 26, 2006

(54) POLYMERS HAVING LOW LEVELS OF LONG CHAIN BRANCHING AND METHODS OF MAKING THE SAME

(75) Inventors: Max P. McDaniel, Bartlesville, OK (US); Kathy S. Collins, Bartlesville, OK (US); Elizabeth A. Benham, Spring, TX (US); Paul J. DesLauriers, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 296 days.

(21) Appl. No.: 10/829,844

(22) Filed: Apr. 22, 2004

(65) Prior Publication Data

US 2005/0239977 A1  Oct. 27, 2005

(51) Int. Cl.
C08F 110/02 (2006.01)
C08F 210/02 (2006.01)
C08F 4/24 (2006.01)

(52) U.S. Cl. .................. 526/352; 526/106; 526/348.2; 526/348

(58) Field of Classification Search ............... 526/352, 526/348.2, 348, 106
See application file for complete search history.

(56) References Cited

U.S. PATENT DOCUMENTS

| | | | |
|---|---|---|---|
| 2,959,577 A | 11/1960 | Hogan | 260/94.9 |
| 3,168,460 A | 2/1965 | Lehman et al. | 208/67 |
| 3,624,063 A | 11/1971 | Witt | 260/93.7 |
| 3,821,123 A | 6/1974 | Germanas et al. | 252/439 |
| 3,838,039 A | 9/1974 | Vesley et al. | 208/108 |
| 3,976,632 A | 8/1976 | Delap | 526/113 |
| 4,246,095 A | 1/1981 | Antos | 208/139 |
| 4,444,966 A | 4/1984 | McDaniel | |
| 4,607,019 A | 8/1986 | Best | 502/119 |
| 4,690,990 A | 9/1987 | McDaniel et al. | 526/138 |
| 4,803,253 A | 2/1989 | McDaniel et al. | 526/352.2 |
| 4,806,513 A | 2/1989 | McDaniel et al. | 502/107 |
| 4,855,271 A | 8/1989 | McDaniel et al. | 502/107 |
| 5,037,911 A | 8/1991 | McDaniel et al. | 526/130 |
| 5,179,178 A | 1/1993 | Stacy et al. | 526/64 |
| 5,182,247 A | 1/1993 | Kuhlmann et al. | 502/217 |
| 5,200,379 A | 4/1993 | McDaniel et al. | 502/154 |
| 5,237,025 A | 8/1993 | Benham et al. | 526/114 |
| 5,244,990 A | 9/1993 | Mitchell | 526/125 |
| 5,270,273 A | 12/1993 | Pelrine et al. | 502/60 |
| 5,275,992 A | 1/1994 | Mitchell et al. | 502/108 |
| 5,401,820 A | 3/1995 | McDaniel et al. | 526/348.5 |
| 5,494,571 A | 2/1996 | Umansky et al. | 208/138 |
| 5,565,175 A | 10/1996 | Hottovy et al. | 422/132 |
| 5,883,036 A | 3/1999 | Fujie et al. | 502/217 |
| 5,965,675 A | 10/1999 | Kellum et al. | 526/82 |
| 5,998,558 A | 12/1999 | Wasserman et al. | |
| 6,107,230 A | 8/2000 | McDaniel et al. | 502/104 |
| 6,239,235 B1 | 5/2001 | Hottovy et al. | 526/64 |
| 6,326,328 B1 | 12/2001 | Matsuzawa | 502/217 |
| 6,734,266 B1 | 5/2004 | Gao et al. | 526/129 |
| 6,867,277 B1* | 3/2005 | Iseki | 526/348.3 |
| 6,867,278 B1* | 3/2005 | McDaniel et al. | 526/348.5 |
| 2003/0087754 A1 | 5/2003 | Gao et al. | |
| 2005/0239641 A1* | 10/2005 | McDaniel et al. | 502/217 |

FOREIGN PATENT DOCUMENTS

| | | |
|---|---|---|
| EP | 0 734 766 A1 | 10/1996 |
| WO | WO 99/60033 | 11/1999 |
| WO | WO 01/32307 A1 | 5/2001 |

OTHER PUBLICATIONS

Hieber, et al., "Some Correlations Involving the Shear Viscosity of Polystyrene Melts," *Rheol Acta*, vol. 28, No. 4, 1989, pp. 321-332.
Hieber, et al., "Shear-Rate-Dependence Modeling of Polymer Melt Viscosity," *Polymer Engineering and Science*, vol. 32, No. 14, Jul. 1992, pp. 931-938.
Bird, et al., "Dynamics of Polymeric Liquids, vol. 1, Fluid Mechanics," 2nd Edition, John Wiley & Sons, 1987, 10 pgs.
McDaniel, "Supported Chromium Catalysts for Ethylene Polymerization," *Advances in Catalysis*, vol. 33, 1985, pp. 47-98.
McDaniel, et al., "Long Chain Branching in Polyethylene From the Phillips Chromium Catalyst," *Polymer Reaction Engineering*, vol. 11, No. 2, 2003, 40 pgs.

* cited by examiner

*Primary Examiner*—Caixia Lu
(74) *Attorney, Agent, or Firm*—Conley Rose, P.C.; Rodney B. Carroll; Cheryl L. Huseman

(57) ABSTRACT

Methods of producing a polymer include contacting at least one olefin with a catalyst prepared by contacting a support comprising alumina with a sulfating agent and with chromium. Polymer compositions produced in this manner may exhibit relatively low levels of long chain branching and relatively high molecular weights. In an embodiment, polymer compositions with a PDI in a range of from about 6 to about 15 have $M_W$ values greater than about 300,000 g/mol and $E_o$ values less than about $1 \times 10^6$ Pa·s. The polymer compositions may further have rheological breadths greater than about 0.25 and relaxation times less than about 10 seconds.

29 Claims, 9 Drawing Sheets

POLYMERS HAVING LOW LEVELS OF LONG CHAIN BRANCHING AND METHODS OF MAKING THE SAME

CROSS-REFERENCE TO RELATED APPLICATIONS

This application is related to commonly owned U.S. patent application Ser. No. 10/829,850, entitled "Methods of Preparing Active Chromium/alumina Catalysts Via Treatment With Sulfate," filed on the same date as the present application and incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to polymers, and more particularly to polymers having relatively low levels of long chain branching and methods of making the same using sulfate treated chromium-based catalysts having alumina supports.

BACKGROUND OF THE INVENTION

Supported chromium oxide catalysts are commonly employed to prepare polyolefins having desirable characteristics. Various supports for chromium oxide catalysts have been disclosed in the art. The particular support used for the chromium oxide strongly affects the properties of the polymer being formed. Silica supports have primarily been used due to their ability to form highly active polymerization catalysts. However, silica supports do not provide for the production of ultra high molecular weight polymers when hexavalent chromium is formed during the catalyst activation, which often occurs.

Aluminum phosphate supports are similar to silica supports in that they form highly active catalysts. However like the silica supports, they also do not have the ability to produce very high molecular weight polymers. Further, the polymers produced using the aluminum phosphate supports tend to contain relatively high amounts of long chain branching, which is not always a desirable property during processing of the polymer. A need therefore exists to develop a method for producing polyolefins having less long chain branching and higher molecular weights.

SUMMARY OF THE INVENTION

Methods of producing a polymer include contacting at least one olefin with a catalyst prepared by contacting a support comprising alumina with a sulfating agent and with chromium. Polymer compositions produced in this manner may exhibit relatively low levels of long chain branching. Such low levels of long chain branching are indicated by the high weight-average molecular weight ($M_W$) values combined with the low zero shear viscosity ($E_o$) values of the polymers. In an embodiment, polymer compositions with polydispersity index values (i.e., $M_W/M_N$) in a range of from about 6 to about 15 have $M_W$ values greater than about 300,000 g/mol and $E_o$ values less than about $1\times10^6$ Pa·s. The low levels of long chain branching are also indicated by the narrow rheological breadths combined with the high $M_W$ values of the polymer compositions. In an embodiment, the polymer compositions have rheological breadths greater than about 0.25. The high $M_W$ values combined with the low relaxation times of the polymers further indicate the low chain branching of the polymers. In an embodiment, polymer compositions have relaxation times less than about 10 seconds.

DETAILED DESCRIPTION OF THE INVENTION

Figure 1:
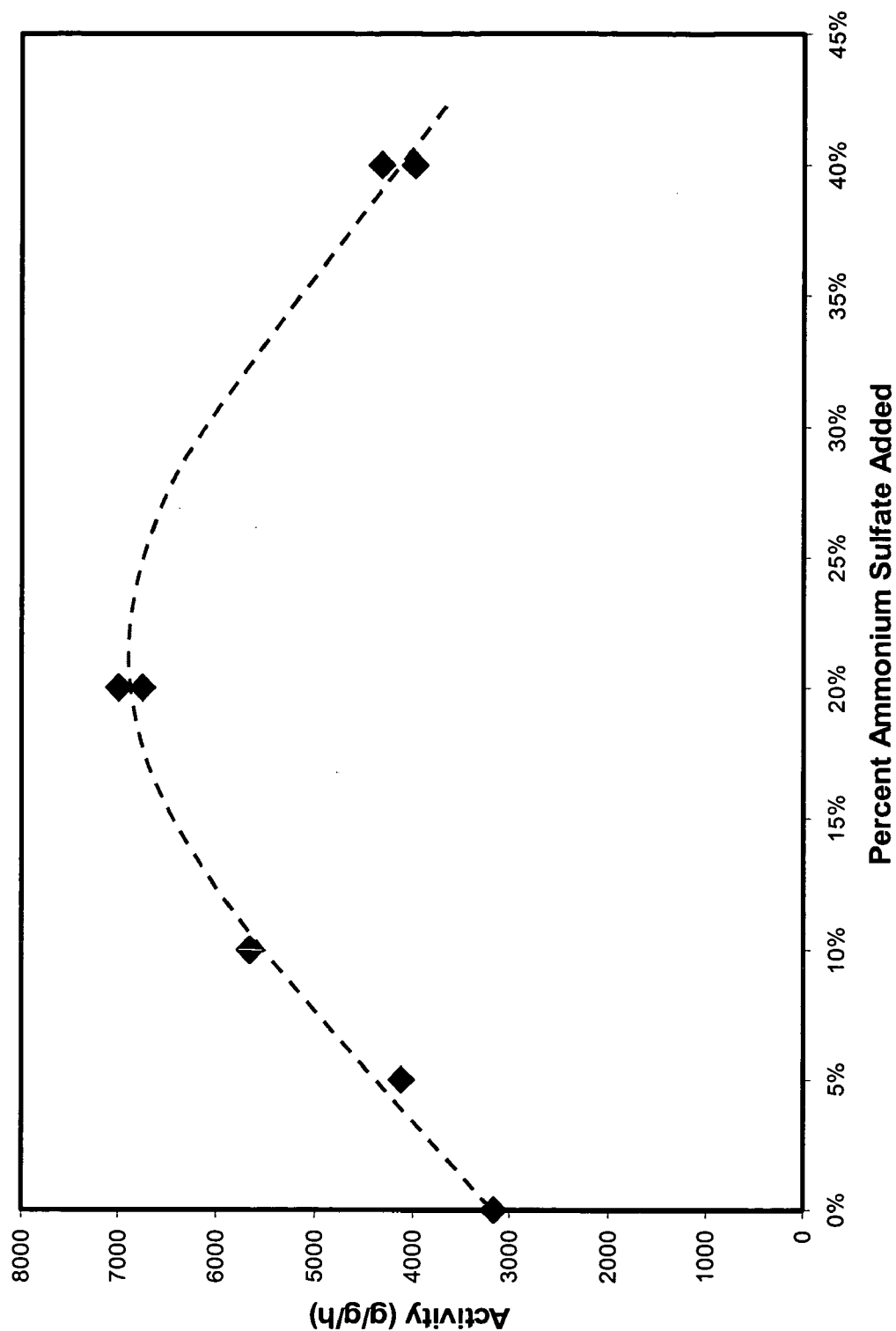
FIG. 1 depicts a graph illustrating the activity of a chromium/alumina catalyst treated with sulfate as a function of the amount of ammonium sulfate added to the catalyst.

A chromium-based catalyst having an alumina ($Al_2O_3$) support may be treated with sulfate (i.e., sulfate anions) to enhance the activity of the catalyst, making its use in the production of polymers commercially viable. The alumina support primarily comprises alumina. In particular, the amount of alumina present in the support is at least 50% by weight of the total support. The alumina support may be made using methods known in the art. Examples of such methods include: reacting sodium aluminate, which is basic, with aluminum sulfate, which is acidic; neutralizing an aluminum salt with a base such as ammonia or ammonia hydroxide; performing flame hydrolysis of an aluminum compound; or performing hydrolysis of an organic solution of an aluminum compound by, e.g., adding water to an alcohol solution of aluminum isopropoxide ($Al(OC3H_7)_3$). Examples of sources of alumina include a crystalline form and a hydrated form of alumina. More specific examples include aluminum hydroxide ($Al(OH)_3$), boehmite (AlOOH) and gamma alumina ($Al_2O_3$). The alumina support can also contain minority amounts of other materials that may be added for various reasons, such as fluoride, phosphate, silica, magnesia, boria, or titania. These materials may be added in the form of cogellation or by surface treatment. Optionally, the alumina support may be calcined prior to any treatment by, e.g., heating in air at a temperature in a range of from about 300° C. to about 900° C. or from about 500° C. to about 800° C.

In a first embodiment, the chromium and the sulfate may be loaded on the alumina support before subjecting the support to a final calcination step for activating the catalyst. In this case, the chromium may be loaded before the sulfate, after the sulfate, or concurrently with the sulfate. The support may also be subjected to an initial calcination step to dehydrate it prior to further treatment with sulfate and chromium. This step converts hydrated forms of alumina precursors, such as $Al(OH)_3$ and $AlOOH$, to less hydrated forms. The initial calcining step may be accomplished by heating the support in an oxidizing, reducing, or inert atmosphere, which may be dry or may contain substantial amounts of humidity. Such initial dehydration may be carried out at a temperature ranging from about 150° C. to about 900° C., from about 200° C. to about 800° C., or from about 300° C. to 700° C. The dehydration step may last for a duration of from a few minutes to about 24 hours. After the initial dehydration step, the support may be given a sulfate and chromium treatment, followed by the final calcination or activation step.

Alternatively, the sulfate may be loaded on the alumina support during the calcination step and after loading the chromium. The chromium may be loaded on the support using incipient wetness impregnation with a solution in which a chromium compound is dissolved. The chromium compound may be one or more compounds suitable for conversion to the hexavalent state of chromium. Examples of suitable chromium compounds include tertiary butyl chromate in a hydrocarbon liquid, chromium trioxide in water, chromium acetate in water, chromium nitrate in alcohol, or combinations thereof. The chromium is added in an amount sufficient to ensure that the final catalyst contains a desired level of chromium.

The sulfate may be loaded on the support by contacting it with a sulfating agent. As used herein, "sulfating agent" is defined as a material capable of providing a sulfate ion to an alumina support, wherein the sulfating agent may be in the form of a solution, a gas, or combinations thereof. When the sulfating agent is a solution, it may be applied to the support via incipient wetness impregnation. When the sulfating agent is a gas such as $SO_3$, it may be introduced to a vessel in which the support is positioned during the calcination of the support. Examples of sulfating agents include: $SO_3$ gas; $H_2SO_4$ in water or an organic liquid such as an alcohol; aqueous solutions comprising at least one of the following compounds: $(NH_4)_2SO_4$, $Al_2(SO_4)_3$, $CuSO_4$, $ZnSO_4$, $KAl(SO_4)_2$, $ZrOSO_4$, $TiOSO_4$, $MgSO_4$, $(NH_4)HSO_4$, $NaHSO_4$, $(NH_4)HSO_3$, $CaSO_4$ and $Cr_2(SO_4)_3$, and combinations thereof. Sulfur containing materials that are capable of further oxidation to sulfate during the calcination step can also serve as the sulfating agent. Examples of such sulfur containing materials include sulfite salts, sulfurous acid, organic sulfides, sulfoxides, $SO_2$. Additional examples of sulfating agents include sulfur halides such as thionyl chloride and sulfuryl chloride.

In a second embodiment in which the chromium compound is an organochromium compound, the sulfate is loaded on the alumina support before performing a calcination step to activate the support, followed by treating the support anhydrously with the organochromium compound. No further calcination of the organochromium compound is required to activate the catalyst. Examples of suitable organochromium compounds include zerovalent compounds such as pi bonded chromium complexes, for example, dicumene chromium and dibenzene chromium. Pi bonded chromium complexes are described in U.S. Pat. No. 3,976,632, which is incorporated by reference herein in its entirety. Other examples include divalent and trivalent organochromium compounds such as chromocene(bis(cyclopentadienyl)chromium (II)), and substituted derivatives thereof in which the cyclopentadienyl rings contain one or more substituents, chromium diallyl and triallyl, bis(2,4 dimethyl pentdienyl)chromium, and amidochromium compounds. Additional examples of organochromium compounds can be found in U.S. Pat. Nos. 4,806,513, 4,690,990, 4,803,253, and 5,200,379, which are incorporated by reference herein in their entirety.

In the two embodiments described above, the calcination step for activating the catalyst is performed by heating it in an oxidizing atmosphere, for example, in the presence of oxygen ($O_2$), at a temperature in a range of from about 200° C. to about 1,000° C., alternatively from about 300° C. to about 800° C., or from about 400° C. to about 700° C. The calcining treatment may also involve reducing or other steps, such as treatment with carbon monoxide, hydrogen, or haliding agents. In the first embodiment, at least a portion of the chromium compound is converted to the hexavalent state as a result of being calcined. A substantial portion of the sulfate remains on the support during the calcination step in both embodiments, resulting in an increase in the activity of the chromium-based catalyst. Without intending to be limited by theory, it is believed that the sulfate bonds with aluminum and replaces hydroxide groups at the surface of the support that hinder the activity of the catalyst. The sulfate also provides greater acidity to the chromium active sites. In addition, the introduction of the sulfate to the support causes little or no sintering of the alumina such that its relatively high surface area and porosity only decline by small amounts.

The activated catalyst formed in the two embodiments described above optionally may be reduced. In an embodiment, the support is reduced by heating it in the presence of carbon monoxide at a temperature in the range of from about 100° C. to about 900° C., alternatively from about 200° C. to about 500° C., or alternatively from about 300° C. to about 400° C.

Catalyst compositions for polymerizing olefins may be formed in the manner described above. Such catalyst compositions may include chromium and aluminum sulfate on an alumina support. The chromium is present in such catalyst compositions in an amount of from about 0.01% to about 10%, from about 0.1% to 10%, from about 0.5% to about 5%, or from about 0.8% to about 3%, all percentages being by total weight of the final catalyst composition. The sulfate is present in an amount of from about 1% to about 50%, from about 5% to about 40%, or from about 10% to about 30%, all percentages being by total weight of the final catalyst composition. In an embodiment, a catalyst composition is formed that has an activity at least about 25% greater than the activity of the same catalyst composition (based on the weight of the alumina support) without sulfate treatment, where the catalyst compositions are run under control conditions to polymerize olefins. In another embodiment, the catalyst composition has an activity more than about 25%, alternatively more than about 50%, or alternatively more than about 100%, greater than the activity of the same catalyst composition without sulfate treatment. Also, in an embodiment, the catalyst composition has a surface area greater than about 50 $m^2/g$, alternatively greater than about 100 $m^2/g$, or alternatively greater than about 200 $m^2/g$. Further, in an embodiment, the catalyst composition has a pore volume greater than about 0.5 cc, alternatively greater than about 0.8 cc, or alternatively greater than about 1 cc.

A polymer composition may be formed by polymerizing at least one monomer in the presence of the foregoing sulfate treated chromium-based catalyst having an alumina support. Examples of suitable monomers include mono-olefins containing 2 to 8 carbon atoms per molecule such as ethylene, propylene, 1-butene, 1-pentene, 1-hexene, and 1-octene. The chromium-based catalyst is particularly suitable for producing polyethylene homopolymers and copolymers of ethylene and mono-olefins containing 3 to 8 carbon atoms per molecules. Any polymerization reactor known in the art that is capable of polymerizing olefin monomers to produce the homopolymers or copolymers described herein also may be used. Such reactors can comprise slurry reactors, gas-phase reactors, solution reactors or any combination thereof. Gas phase reactors can comprise fluidized bed reactors or tubular reactors. Slurry reactors can comprise vertical loops or horizontal loops. Solution reactors can comprise stirred tank or autoclave reactors. Such reactors can be combined into multiple reactor systems operated in parallel or in series. The catalyst also may be used to produce ethylene polymers in a particle form process as disclosed in U.S. Pat. Nos. 3,624,063, 5,565,175, and 6,239,235, which are incorporated by reference herein in their entirety. If desired, hydrogen (H2) also may be introduced to the reaction zone to reduce the molecular weight of the polymer formed. The amount of catalyst present in the reaction zone may range from about 0.001% to about 1% by weight of all materials in the reaction zone.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

In one embodiment, the monomer also may be contacted with a cocatalyst in addition to the chromium-based catalyst. The cocatalyst may be contacted with the catalyst either before or after entry into the reaction zone. For example, the catalyst and cocatalyst may each be fed independently into a mixing vessel ahead of the reactor where they are allowed to pre-contact each other in a hydrocarbon solvent for a period of from about 1 minute to about 10 hours at temperatures ranging from about −20° C. to about 100° C. After this duration, the contacted catalyst and cocatalyst are both fed to the reaction zone. Since each feed stream can be measured and controlled independently, pre-contacting the catalyst and the cocatalyst provides a method of continuously controlling the composition of the catalyst and thereby the properties of the polymer produced. Alternatively, some or all of the catalyst and cocatalyst may also be fed directly into the reaction zone where they contact each other for the first time in the presence of the monomer. Examples of suitable cocatalysts include organoaluminum compounds such as triethylaluminum, organoboron compounds such as triethylboron, tri-n-butylborane, and tripropylborane, and combinations thereof. Other suitable organoaluminum compounds include aluminum alkyls such as $R_3^4Al$, $R_2^4AlX$, and $R^4AlX_2$ compounds where $R^4$ is a 1 to 12 carbon atom hydrocarbyl radical and X is a halogen such as chlorine. The cocatalyst may, for example, be triethylaluminum chloride or diethylaluminum chloride. Other suitable organoboron compounds include trialkyl boron compounds, particularly those having alkyl groups of 1 to 12 carbon atoms or 2 to 5 carbon atoms, triaryl boron compounds such as triphenylborane, alkyl boron alkoxides such as $B(C_2H_5)_2OC_2H_5$ and halogenated alkyl boron compounds such as $BC_2H_2Cl_2$. Alkyls of lithium, magnesium, zinc, and other metals and organohydrosilanes may also be used as a cocatalyst. The cocatalyst may be premixed with the catalyst, or alternatively it may be introduced into the reaction zone as a separate stream. The amount of cocatalyst present in the reaction zone may be in the range of from about 0.2 to about 25 or from about 0.2 to about 10 parts per million by weight based on the weight of the solvent or diluent in systems employing such solvent or diluent. When no solvent or diluent is used, the catalyst may be impregnated with the cocatalyst in an amount that provides for a cocatalyst to chromium mole ratio in the range of from about 0.1:1 to about 100:1, alternatively from about 0.5:1 to about 50:1, or from about 1:1 to 10:1.

In another embodiment, the monomer may be contacted with another catalyst simultaneously with the sulfated chromium-based catalyst and the cocatalyst if one is used. For example, the sulfated chromium-based catalyst may be used in conjunction with a Ziegler-Natta catalyst to produce a bimodal polymer in a single reactor using one set of polymerization conditions. Suitable Ziegler-Natta catalyst are disclosed in U.S. Pat. Nos. 5,275,992, 5,237,025, 5,244,990, 5,179,178, 4,855,271, 5,179,178, 5,275,992, and 4,607,019, each of which is incorporated by reference herein in its entirety. The sulfated chromium/alumina catalyst also may be used with another chromium-based catalyst such as a chromium/silica catalyst. A bimodal polymer has both relatively high and low molecular weight distributions and thus exhibits physical properties characteristic of both such as stress crack resistance and good processability.

Polymers such as polyethylene homopolymers and copolymers of ethylene with other mono-olefins may be produced in the manner described above to have unique properties. For instance, the polymers exhibit relatively low levels of long chain branching. Such low levels of long chain branching are indicated by the narrow rheological breadths combined with the high $M_W$ values of the polymers. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$E = E_o[1 + (T_\xi \dot\gamma)^a]^{\frac{n-1}{a}}$$

where

E=viscosity (Pa·s)

$\dot{\gamma}$=shear rate (1/s)

a=rheological breadth parameter $T_\xi$=relaxation time(s) [describes the location in time of the transition region]

$E_o$=zero shear viscosity (Pa·s) [defines the Newtonian plateau]

n=power law constant [defines the final slope of the high shear rate region]

To facilitate model fitting, the power law constant is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety. In particular, the polymers have high "a" parameter values greater than about 0.25, greater than about 0.30, or greater than about 0.35, indicating the narrowness of their rheological breadths. The polymers exhibit a narrow rheological breadth even when the polymers have low high load melt index (HLMI) values. The HLMI represents the rate of flow of a molten resin through an orifice of 0.0825 inch diameter when subjected to a force of 21,600 grams at 190° C. The HLMI values are determined in accordance with ASTM D1238 condition E. The polymers have HLMI values less than about 5 g/10 min, less than about 3 g/10 min, or less than about 2 g/10 min.

The low levels of long chain branching of the polymers are also indicated by the high weight-average molecular weight ($M_W$) values combined with the low zero shear viscosity ($E_o$) values of the polymers. In particular, the polymers have $M_W$'s greater than about 300,000 grams/mole (g/mol), greater than about 400,000 g/mol, or greater than about 500,000 g/mol. Also, they have $E_o$ values less than about 5×10⁶ Pa·s, less than about 1×10⁶ Pa·s, or less than about 5×10⁵ Pa·s. The high $M_W$ values combined with the low relaxation times ($T_\xi$) the polymers further indicate the low chain branching of the polymers. In particular, the polymers have relaxation times less than about 10 seconds, less than about 7 seconds, or less than about 5 seconds. The polymers further have high tan delta values. Tan delta is the ratio of the loss modulus to the elastic modulus measured at a particular frequency on an oscillating viscometer as described above. In particular, the polymers have tan delta values, measured at 0.1 radians/second (very low shear rates), greater than about 1.5, alternatively greater than about 1.7, or alternatively greater than about 1.9 when the $M_W$ is above 300,000 g/mol.

In addition, polyethylene resins produced using the sulfate treated chromium/alumina catalyst are unique in their molecular weight distributions. The molecular weight distribution (MWD) can be described by a parameter known as the polydispersity index (PDI), which indicates the breadth of the molecular weight distribution and is equivalent to the weight-average molecular weight of a polymer divided by the number-average molecular weight of the polymer (i.e., $M_W/M_N$). In particular, the polyethylene resins have PDI values greater than about 4, greater than about 6, greater than about 8, or greater than about 10. Surprisingly, the PDI values of such polyethylene resins also are often less than about 20, less than about 17, less than about 15, or even less than about 12. In an embodiment, the polyethylene resins have PDI values in the range of from about 6 to about 15. Further, the $M_Z$ (z-average molecular weight)/$M_W$ ratios of the polymer compositions are less than about 10, alternatively less than about 6, or less than about 5 and thus indicate a relatively high tail in the MWD.

Throughout the specification, the molecular weights and molecular weight distributions are obtained using gel permeation chromatography (GPC). The GPC is performed using a Waters 150 CV gel permeation chromatograph with trichlorobenzene (TCB) as the solvent, with a flow rate of 1 milliliter/minute at a temperature of 140° C. 2,6-Di-t-butyl-4-methylphenol (BHT) at a concentration of 1.0 gram per liter is used as a stabilizer in the TCB. An injection volume of 220 liters is used with a nominal polymer concentration of 0.3 gram/liter at room temperature. Dissolution of the sample in stabilized TCB is carried out by heating at about 160–170° C. for 20 hours with occasional, gentle agitation. The gel permeation chromatograph includes two Waters HT-6E columns (7.8 mm×300 mm). The columns were calibrated with a broad linear polyethylene standard (Phillips Marlex.RTM. BHB 5003) for which the molecular weight has been determined.

Polymer resins having the previously described properties may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

The following procedure was repeated 3 times to form 3 different catalyst samples (samples 1, 2, and 3). An alumina support (alumina "A") purchased from W. R. Grace Company was calcined in nitrogen at 600° C. in preparation for its use as a catalyst. The support had a surface area of about 280 m²/g and a pore volume of about 1.5 cc/g. The alumina support was then impregnated with various amounts of ammonium sulfate in aqueous solution as shown in Table 1 below, followed by drying the support in a vacuum oven at 100° C. for about 10 hours. The support was then impregnated with a methanolic solution of $Cr(NO_3)_3$ to incorporate chromium therein, followed by drying it in a vacuum oven at 100° C. for about 10 hours. The resulting catalyst precursor was then activated by calcination in dry air for about 3 hours at 600° C.

Table 1 shows several physical properties of the activated catalyst samples and the compositions of the catalyst samples. Table 1 further provides the weight percent of sulfate added to each alumina support and the weight percent of sulfate actually found by X-ray fluorescence analysis in each catalyst sample after the calcination step, all weight percentages being by total weight of the catalyst. Based on the results depicted in Table 1, all or a substantial portion of the sulfate added to the support was retained on the catalyst during the calcination. For samples 1 and 2, the amount of sulfate measured after calcining was slightly larger than the actual amount of sulfate added. This additional amount of sulfate may be explained by the observance that the base alumina initially contained about 1.7% sulfate residue as $Na_2SO_4$ by weight of the support as a result of its preparation. It was also observed that the weight of the alumina support increased significantly due to the adsorption of the sulfate. However, adding sulfate to the support did not contribute additional surface area to the support. A "Quantachrome Autosorb-6 Nitrogen Pore Size Distribution Instrument" was used to determine the surface area and pore volume of the supports. This instrument was acquired from the Quantachrome Corporation of Syosset, N.Y.

The measured surface area and pore volume, expressed per gram of the finished catalyst, are also shown in Table 1. In addition, the measured surface area and pore volume were corrected for the additional weight of the sulfate as shown in Table 1 and are also expressed in Table 1 per gram of the original alumina support. In view of these corrected values, surface area and pore volume did not significantly decline as the amount of sulfate added was increased. Rather, they surprisingly stayed about the same. A new class of polymerization catalysts has therefore been created.

stirrer rotating at 400 rpm. A steel jacket containing boiling methanol with a connection to a steel condenser surrounded the reactor. The boiling point of the methanol was controlled by varying nitrogen pressure applied to the condenser and jacket, which permitted precise temperature control to within half a degree centigrade, with the help of electronic control instruments. A small amount (about 0.04 to 0.10 grams) of the catalyst sample was first charged under nitrogen to the dry reactor. Next 1.2 liter of isobutane liquid was charged to the reactor, and the reactor was heated up to 95° C. Triethylboron (TEB) cocatalyst was added in a heptane solution midway during the isobutane addition. The amount of TEB cocatalyst added was equal to about 8 ppm of the isobutane diluent by weight. Finally, ethylene was added to the reactor to equal a fixed pressure of 550 psig, which was maintained during the experiment. The stirring was allowed to continue for about one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating, or other forms of fouling. The polymer powder was then removed and weighed. Activity was specified as grams of polymer produced per gram of solid catalyst charged per hour.

TABLE 1

| Catalyst Sample | Amount of $(NH_4)_2SO_4$ Added, grams/100 g of $Al_2O_3$ | Amount of $SO_4$ Added, wt. % | Amount of $SO_4$ Measured, wt. % | Measured Pore Volume, cc/g | Measured Surface Area, $m^2/g$ | Corrected Surface Area, $m^2/g$ | Corrected Pore Volume, cc/g |
|---|---|---|---|---|---|---|---|
| Alumina A | 0 | 0 | 1.7 | 1.45 | 300 | 300 | 1.45 |
| 1 | 10 | 6.78 | 8.7 | 1.356 | 195.5 | 214 | 1.49 |
| 2 | 20 | 12.70 | 14.28 | 1.296 | 285.2 | 333 | 1.51 |
| 3 | 40 | 22.54 | 19.35 | 1.173 | 164.5 | 204 | 1.45 |

Example 2

Catalyst samples (samples 4–9) were prepared in the same manner as described in Example 1 with different amounts of sulfate except that sample 4 contained no sulfate. The amount of sulfate added to each catalyst sample and the weight percent of hexavalent chromium (Cr VI) contained in each sample by total weight of the sample are shown in Table 2 below.

A polymerization run using each catalyst sample was made in a 2.2 liter steel reactor equipped with a marine The results of these polymerization runs are shown in Table 2 below. The HLMI of the polymer resin recovered from each run was determined in accordance with ASTM D1238. All of the polymers had an HLMI of zero. To compensate for the sulfate weight gain, the activity was corrected and is thus expressed as grams of polymer produced per gram of the original alumina support per hour. In most cases, adding sulfate to the catalyst increased the activity of the catalyst. The activity of these catalysts is plotted against sulfate loading in FIG. 1.

TABLE 2

| Run No. | Catalyst Sample No. | Amount of $(NH_4)2SO_4$ added, grams per 100 g $Al_2O_3$ | Amount of Cr VI, wt. % | Catalyst Charged, g | Polymer Yield, g | Run Time, min | Activity, g/g $Al_2O_3$/h | Corrected Activity, g/g $Al_2O_3$/h |
|---|---|---|---|---|---|---|---|---|
| 1 | 4 | 0 |  | 0.0303 | 48 | 30 | 3168 | 3168 |
| 2 | 5 | 5 |  | 0.058 | 119 | 31 | 3971 | 4115 |
| 3 | 6 | 10 | 0.3286 | 0.0458 | 141 | 35 | 5278 | 5661 |
| 4 | 6 | 10 | 0.3286 | 0.044 | 131 | 34 | 5254 | 5636 |
| 5 | 6 | 10 | 0.3286 | 0.0458 | 141 | 35 | 5278 | 5661 |
| 6 | 6 | 10 | 0.3286 | 0.044 | 131 | 34 | 5254 | 5636 |
| 7 | 7 | 20 |  | 0.0605 | 142 | 30 | 4694 | 5377 |

TABLE 2-continued

| Run No. | Catalyst Sample No. | Amount of (NH$_4$)2SO$_4$ added, grams per 100 g Al$_2$O$_3$ | Amount of Cr VI, wt. % | Catalyst Charged, g | Polymer Yield, g | Run Time, min | Activity, g/g Al$_2$O$_3$/h | Corrected Activity, g/g Al$_2$O$_3$/h |
|---|---|---|---|---|---|---|---|---|
| 8 | 7 | 20 | 0.2295 | 0.0533 | 158 | 30 | 5929 | 6791 |
| 9 | 7 | 20 | | 0.0605 | 142 | 30 | 4694 | 5377 |
| 10 | 8 | 20 | | 0.1235 | 246 | 20 | 5976 | 6845 |
| 11 | 8 | 20 | | 0.0497 | 112 | 34 | 3977 | 4555 |
| 12 | 8 | 20 | | 0.0384 | 87 | 31 | 4385 | 5023 |
| 13 | 9 | 40 | 0.1046 | 0.0652 | 131 | 39 | 3091 | 3990 |
| 14 | 9 | 40 | 0.1046 | 0.0711 | 123 | 31 | 3348 | 4322 |

Example 3

Figure 2:
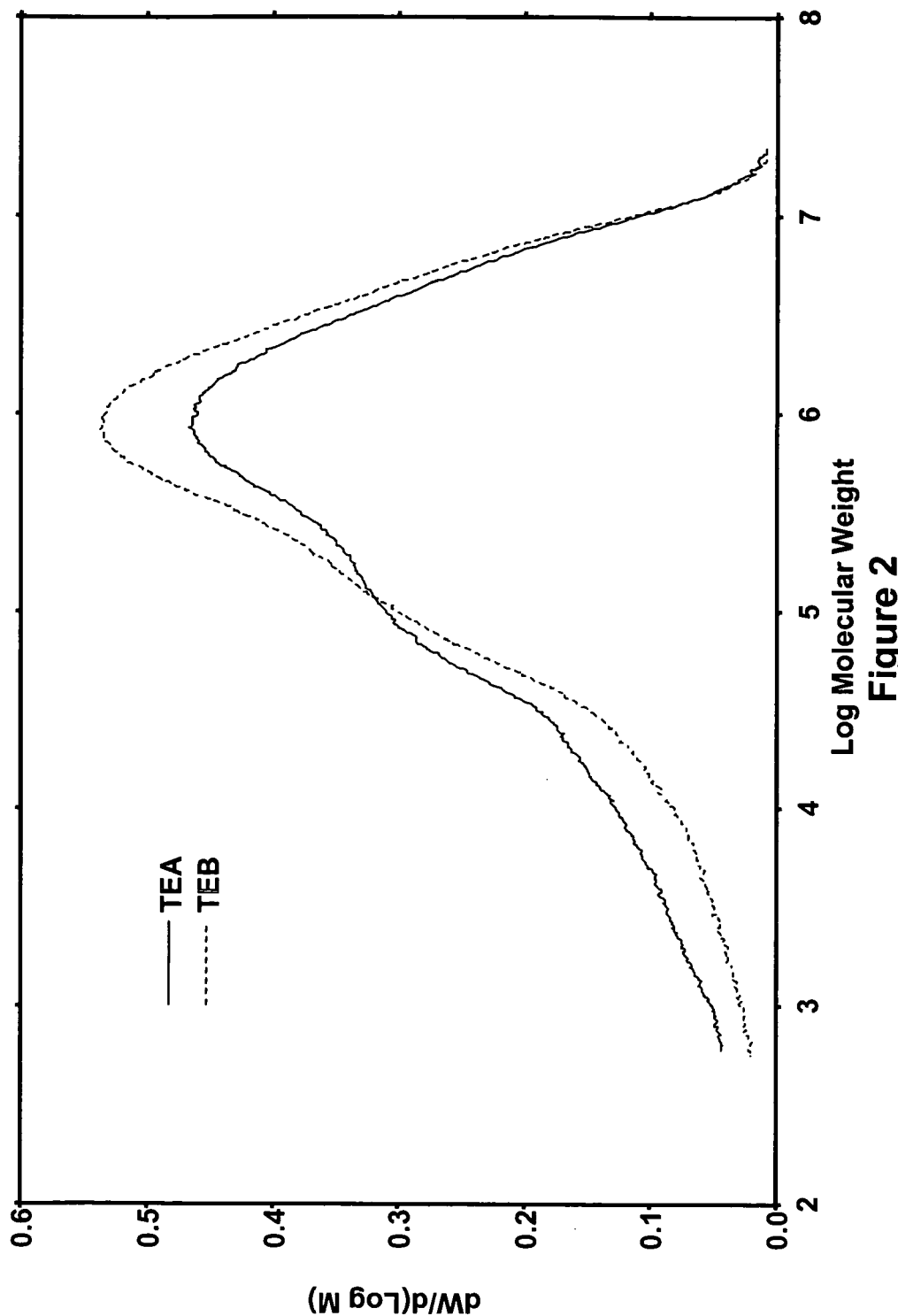
FIG. 2 depicts the molecular weight distributions of polyethylene resins formed using a chromium/alumina catalyst treated with sulfate.

A catalyst treated with 20 parts of ammonium sulfate per 100 parts by weight of alumina was made according to the procedure described in Example 1. The catalyst contained 2% Cr by weight of the alumina. It was calcined at 600° C. for activation, and then it was used to polymerize ethylene at 95° C. and 550 psig according to the procedure described above, with the exception of two changes. First, two of the runs were performed using 8 ppm of triethylaluminum (TEA) as the cocatalyst, and two runs were performed using 8 ppm of triethylboron (TEB) as the cocatalyst. Second, 50 psig of H$_2$ was added to the autoclave after isobutane addition but before ethylene addition. This was done during each run to decrease the molecular weight of the polyethylene resin formed in each run. Despite the large amount of hydrogen added, the polyethylene resins still had HLMI values of zero. FIG. 2 illustrates the molecular weight distributions of the polyethylene resins produced in those runs. As can be seen in FIG. 2, the molecular weight distributions of the polyethylene resins were moderately broad, and their M$_W$ values were very high. In fact, the average M$_W$ was over 1 million, which is surprising considering the large amount of H$_2$ present. Despite this high M$_W$, there is a lack of high M$_W$ tail, as can be seen from the sharp decline in the molecular weight distribution curve at high M$_W$. This can also be seen by lower M$_Z$/M$_W$ ratios, which also measures breadth but is more sensitive to the high side of the distribution.

Figure 3:
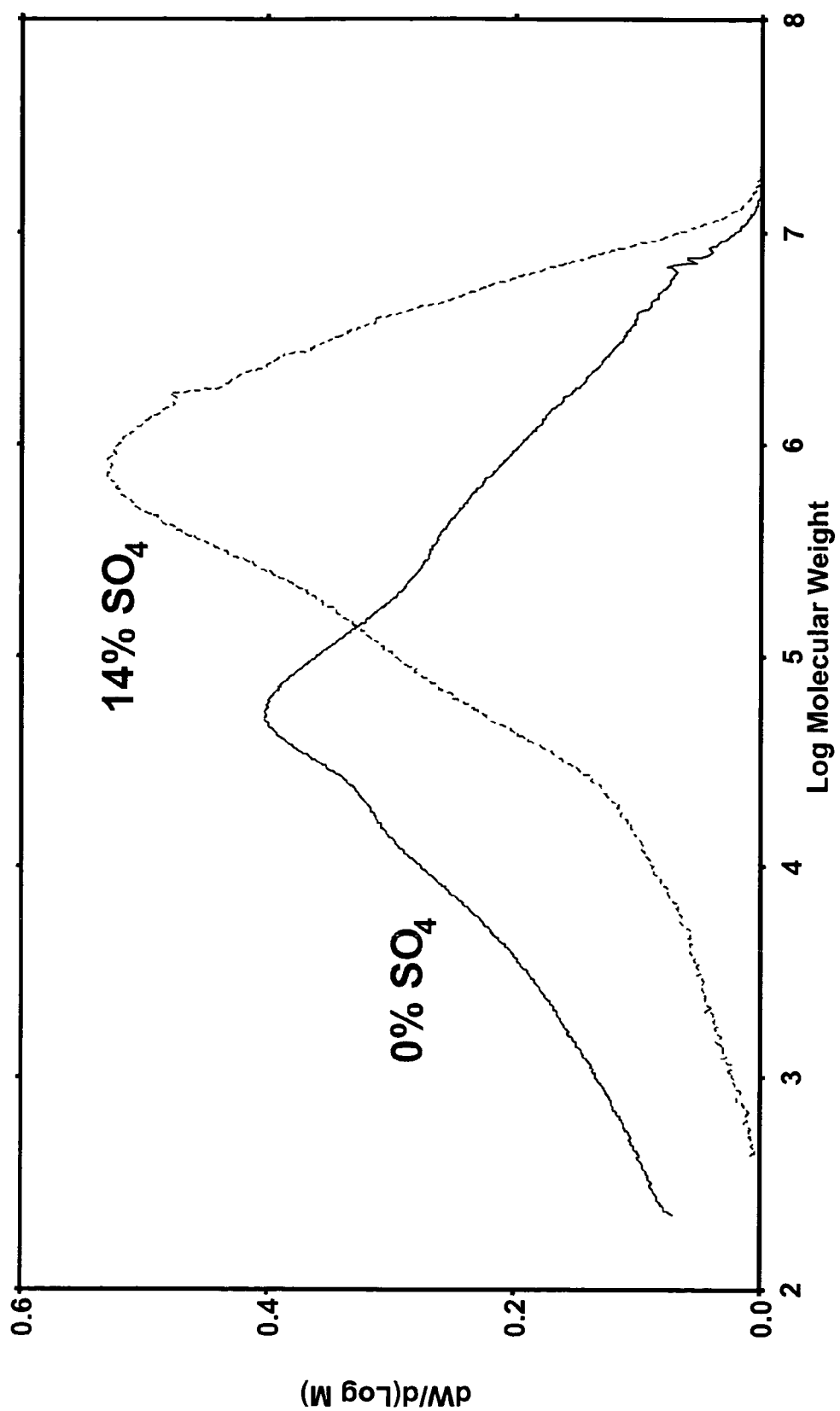
FIG. 3 depicts the molecular weight distributions of polyethylene resins formed using chromium/alumina catalysts treated with sulfate and not treated with sulfate.

FIG. 3 compares the molecular weight distribution of one of the foregoing polymers formed using the sulfate treated Cr/alumina catalyst (treated with 14% SO$_4$ by weight of the catalyst) and the TEB cocatalyst to the MWD of a polymer formed using a Cr/alumina catalyst containing no sulfate but otherwise prepared, activated, and run identically. FIG. 3 again illustrates the narrowing effect of the sulfate on the MWD.

Example 4

Catalysts treated with 0 to 40 parts ammonium sulfate per 100 parts alumina by weight were made as previously described in Example 1. These catalysts contained 2% Cr by weight of the alumina and were calcined at 600° C. for activation. These catalysts were then allowed to polymerize ethylene at 95° C. and 550 psig as previously described, except that 175 psig of hydrogen gas was added to decrease the molecular weight of the polymer formed. The cocatalyst used was 8 ppm by weight (based on the isobutane diluent) of a mixture of 3 parts TEB and 1 part TEA.

As shown in Table 3 below, various properties of the polyethylene resin produced in each run were determined at 190° C. GPC was employed to determine the M$_W$, M$_N$, and M$_Z$ values for each polyethylene resin. The zero shear viscosity (E$_o$), relaxation time (T$_\xi$), rheological breadth parameter (a), and the tan delta of each polyethylene resin were determined as described above. Two HLMI values are provided: the first one was determined using the aforementioned ASTM method and the second one was calculated using the rheology of the polymer. The melt index (MI), which represents the rate of flow of a molten resin through an orifice of 0.0825 inch diameter when subjected to a force of 2,160 grams at 190° C., was determined in accordance with ASTM D1238.

As shown in Table 3, despite the large amount of H$_2$ added, the polyethylene resins had low HLMI values, which indicate that they had high molecular weights. Further, as the amount of sulfate increased, the HLMI dropped, indicating that the presence of the sulfate caused the molecular weights to increase. The measured molecular weights also increased as the amount of sulfate increased. Despite the high molecular weights, the polydispersity index values (M$_W$/M$_N$) of the polyethylene resins were surprisingly narrow, with M$_W$/M$_N$ values ranging from 8 to 13. The resins also unexpectedly exhibited M$_Z$/M$_W$ values of around 4. The M$_Z$/M$_W$ is another measure of molecular weight breadth, which is particularly sensitive to the highest molecular weight components of the distribution.

A distinctive feature of the polymer resins was their low degree of long chain branching, as indicated by several of the results in Table 3. The HLMI/MI ratio values were much lower than those of polymers produced by other chromium-based catalysts at such high M$_W$. Despite having M$_W$ values in the range of 300,000 to over 500,000 g/mol, the relaxation times of the resins were only 2 to 6 seconds, which is also unique for polymers in general, and especially for polymers produced by chromium-based catalysts. The resins also exhibited high tan delta (measured at 0.1 rad/sec) values and a parameters unprecedented by other chromium-based catalysts. In each case, the addition of sulfate caused those values to go up, indicating a decrease in long chain branching. In fact, the catalyst containing the largest amount of sulfate produced a polyethylene resin having a M$_W$ of over half a million and a parameter of 0.38. A parameter of 0.38 is above that expected from even a Ziegler-Natta catalyst at the same M$_W$. The high tan delta values exhibited by the polyethylene resins also indicate that the resins were essentially linear.

TABLE 3

| | Run Number | | | | |
|---|---|---|---|---|---|
| | 1 | 2 | 3 | 4 | 5 |
| Amount of (NH$_4$)$_2$SO$_4$ Added, g/100 g Al$_2$O$_3$ | 0 | 10 | 20 | 20 | 40 |
| HLMI, g/10 min | 4.7 | 2.96 | 2.55 | 2.07 | 0.277 |
| Cr (VI), wt. % | 1.8 | 0.3286 | 0.4389 | 0.2295 | 0.1046 |
| Mn/1000, kg/mol | 4.4 | 24.33 | 26.27 | 32.2 | 65.03 |
| Mw/1000, kg/mol | 459 | 328.6 | 301.7 | 367.83 | 521.14 |
| Mz/1000, kg/mol | 3600 | 1361.49 | 1265.41 | 1548.55 | 2295.61 |
| Mw/Mn | 105 | 13.503 | 11.487 | 11.422 | 8.014 |
| Mz/Mw | 7.8 | 4.14 | 4.19 | 4.21 | 4.40 |
| Zero Shear Viscosity, Pa · s | 8.1E+6 | 4.88E+05 | 4.45E+5 | 6.82E+05 | 1.38E+6 |
| Relaxation Time, s | 137 | 2.12 | 1.83 | 3.14 | 5.52 |
| Rheological Breadth Parameter, a | 0.2749 | 0.2962 | 0.3027 | 0.30 | 0.3846 |
| MI, g/10 min | 0.008 | 0.049 | 0.0495 | 0.0334 | 0.0099 |
| HLMI, g/10 min | 0.92 | 2.18 | 2.11 | 1.50 | 0.32 |
| HLMI/MI | 115 | 45 | 43 | 45 | 33 |
| Tan delta @ 0.1/s | 0.853 | 1.841 | 1.917 | 1.705 | 1.562 |

Figure 4:
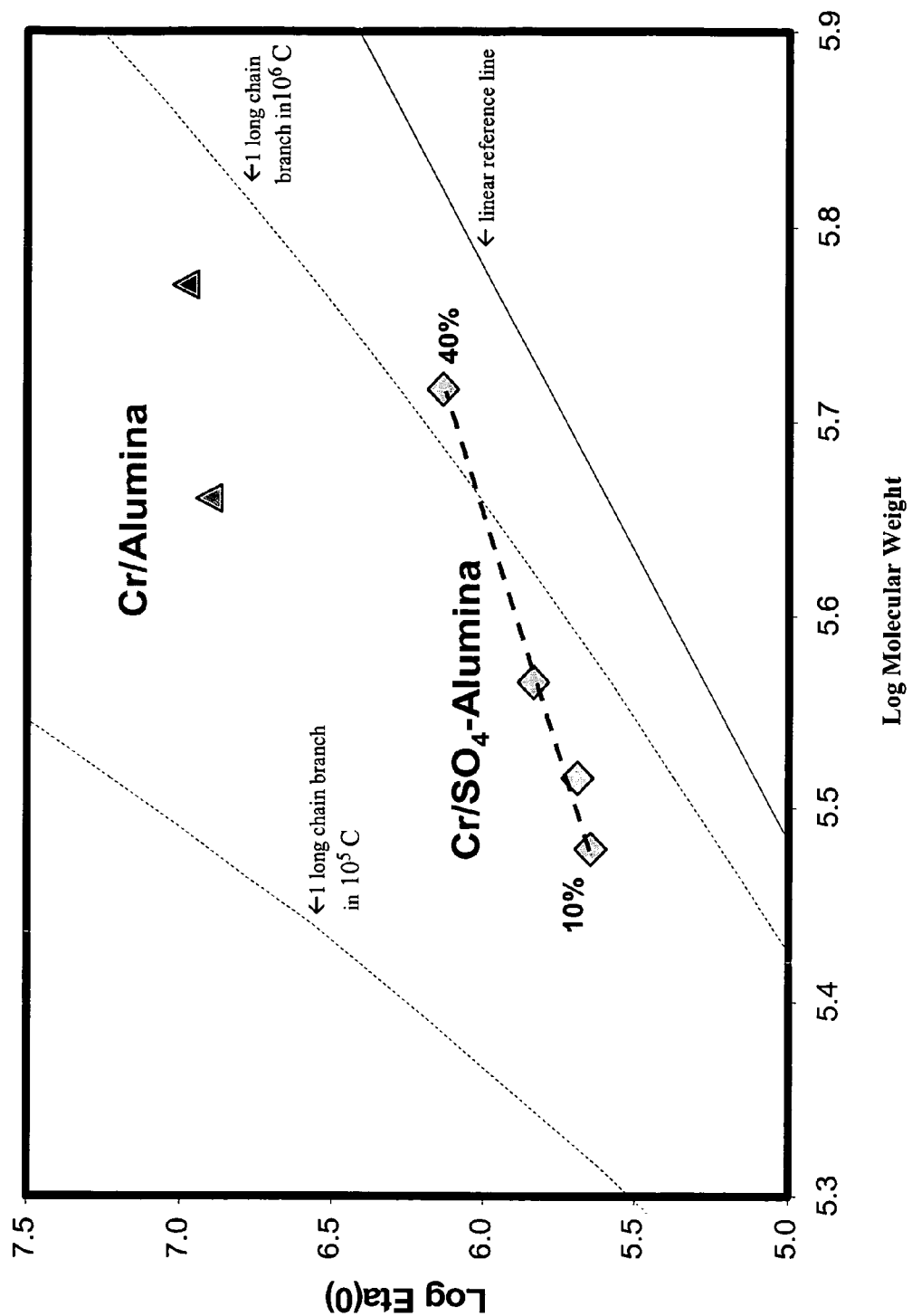
FIG. 4 depicts an Arnett plot showing the linearity of polyethylene resins formed using chromium/alumina catalysts treated with sulfate and not treated with sulfate.

Another indication of the effect of sulfate in decreasing long chain branching can be seen in FIG. 4, which is called an "Arnett" plot. Additional disclosure regarding the Arnett plot can be found in *Long Chain Branching in Polyethylene from the Phillips Chromium Catalyst*, M. P. McDaniel,* D. C. Rohlfing, and E. A. Benham, Polymer Reaction Engineering Vol. 11, No. 2, pp. 105–135, 2003, which is incorporated by reference herein in its entirety. When the log of the zero shear melt viscosity is plotted against the log of the weight average molecular weight, linear polymers fall on the Arnett reference line, which is also shown in FIG. 3. Thus, the farther off this line a point falls, the more long chain branching it contains. The two curve lines represent 1 branch in $10^6$ and $10^5$ carbons. Thus, one can see that the more sulfate added, the closer the points come to the linear reference line.

Figure 5:
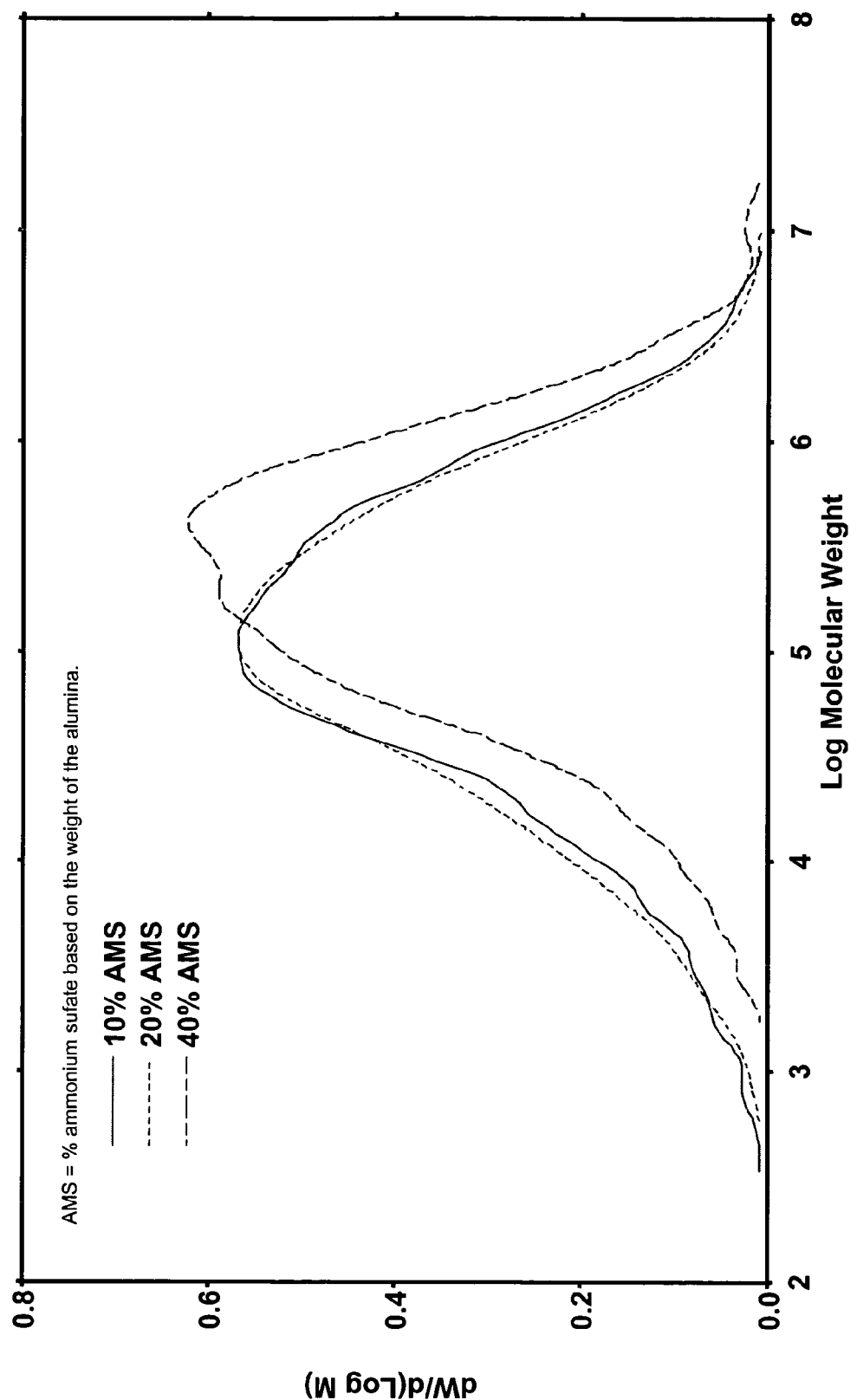
FIG. 5 depicts the molecular weight distributions of polyethylene resins formed using chromium/alumina catalysts treated with different amounts of ammonium sulfate.

FIG. 5 shows the molecular weight distribution of some of the polymers in Table 3. One can see that as sulfate is added to the catalyst, the molecular weight distribution narrows, eliminating especially the low molecular weight end of the curve.

Example 5

The following run was performed twice and demonstrates the use of an organochromium compound with the sulfated alumina support. Alumina A from W. R. Grace was again obtained and impregnated with an aqueous solution of ammonium sulfate to incipient wetness. The total amount of ammonium sulfate added was equivalent to 20 wt. % based on the weight of the alumina (calculated as Al$_2$O$_3$). After being dried in a vacuum oven for 12 hours, this powder was then calcined in dry air for 3 hours at 600° C. About 10 grams of the calcined sulfated alumina was then slurried in about 100 mL of dry heptane, to which was injected dicumene chromium (0) slowly over about 1 minute, in an amount chosen to yield 1% Cr (calculated as the metal) by weight based on the weight of the calcined sulfated alumina. The dicumene chromium was quickly adsorbed onto the support, as indicated by the color migration from the heptane liquid to the support. After adsorption at room temperature, the remaining heptane was evaporated off with gentle heat (~40° C.).

Figure 6:
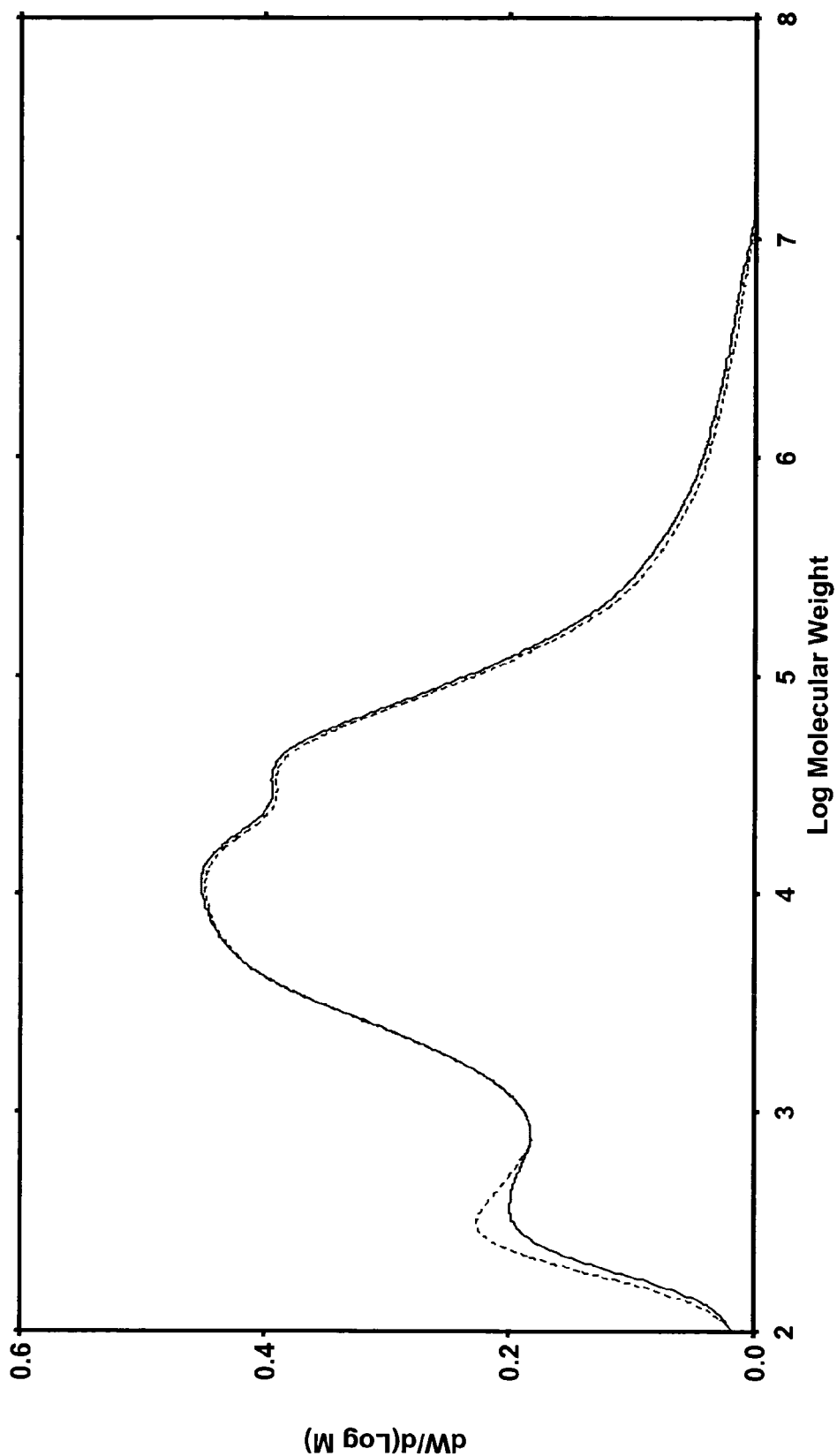
FIG. 6 depicts the molecular weight distributions of polyethylene resins formed using organochromium/alumina catalysts treated with sulfate.

Exactly 0.1513 gram of the catalyst described above was then added to the reactor described above, followed by 1.2 liters of isobutane, 20 psi hydrogen, and then 550 psig ethylene. Each polymerization run was made at 100° C. for 70 minutes, and yielded 74 grams of polyethylene. The melt index obtained for each sample was 32.9. The MWD's for the two runs are shown in FIG. 6. In each run, a very broad MWD was obtained having a $M_N$ of 1730, a $M_W$ of 116,000, and a $M_Z$ of 2,912,000.

Example 6

The following runs demonstrate the use of sulfate to modify the molecular weight distribution on an aluminophosphate catalyst. Alumina A having a surface area of about 300 m$^2$/g and a pore volume of about 1.5 cc/g was obtained from W. R. Grace. It was calcined in flowing dry nitrogen at 600° C. for about 1 hour. At this point some of the alumina was treated with sulfate and the rest was not. The alumina to be sulfated was then impregnated to incipient wetness with water containing sulfuric acid in an amount equivalent to 7.3% by weight of the dry alumina to be used (calculated as Al$_2$O$_3$). The damp powder was then dried at 110° C. for 8 hours and again calcined in nitrogen at 600° C. for about an hour.

Then samples of both sulfated and non-sulfated aluminas were slurried in methanol to which ammonium bifluoride, phosphoric acid and chromium nitrate were added sequentially. A final drying at 100° C. for 8 hours under vacuum removed excess methanol. These catalysts contained about 2% Cr by weight of the catalyst. The amounts of phosphate and fluoride added are listed in Tables 4 and 5 below. Each catalyst was then activated by calcination in flowing dry air at 400 to 750° C. as shown in the tables. Polymerization runs were made at 95° C. by the same procedures described above. Triethylaluminum or triethyboron cocatalyst was used, along with 50 psig H$_2$. Ethylene was supplied on demand at 550 psig for about 60 minutes.

Figure 7:
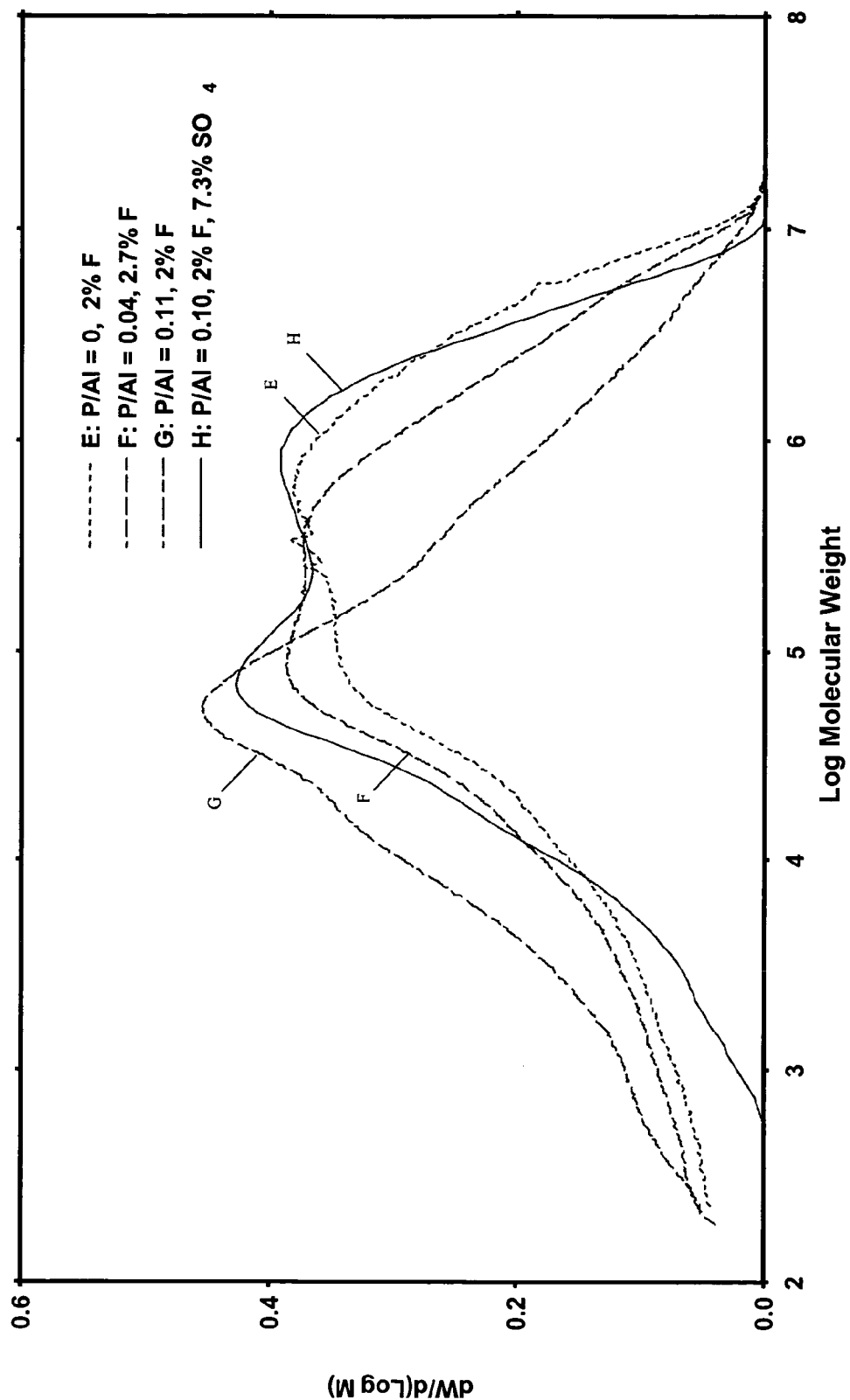
FIGS. 7 and 8 depict the molecular weight distributions of polyethylene resins formed using chromium/alumina catalysts, some of which were treated with varying amounts of phosphate, fluoride, and sulfate.
Figure 8:
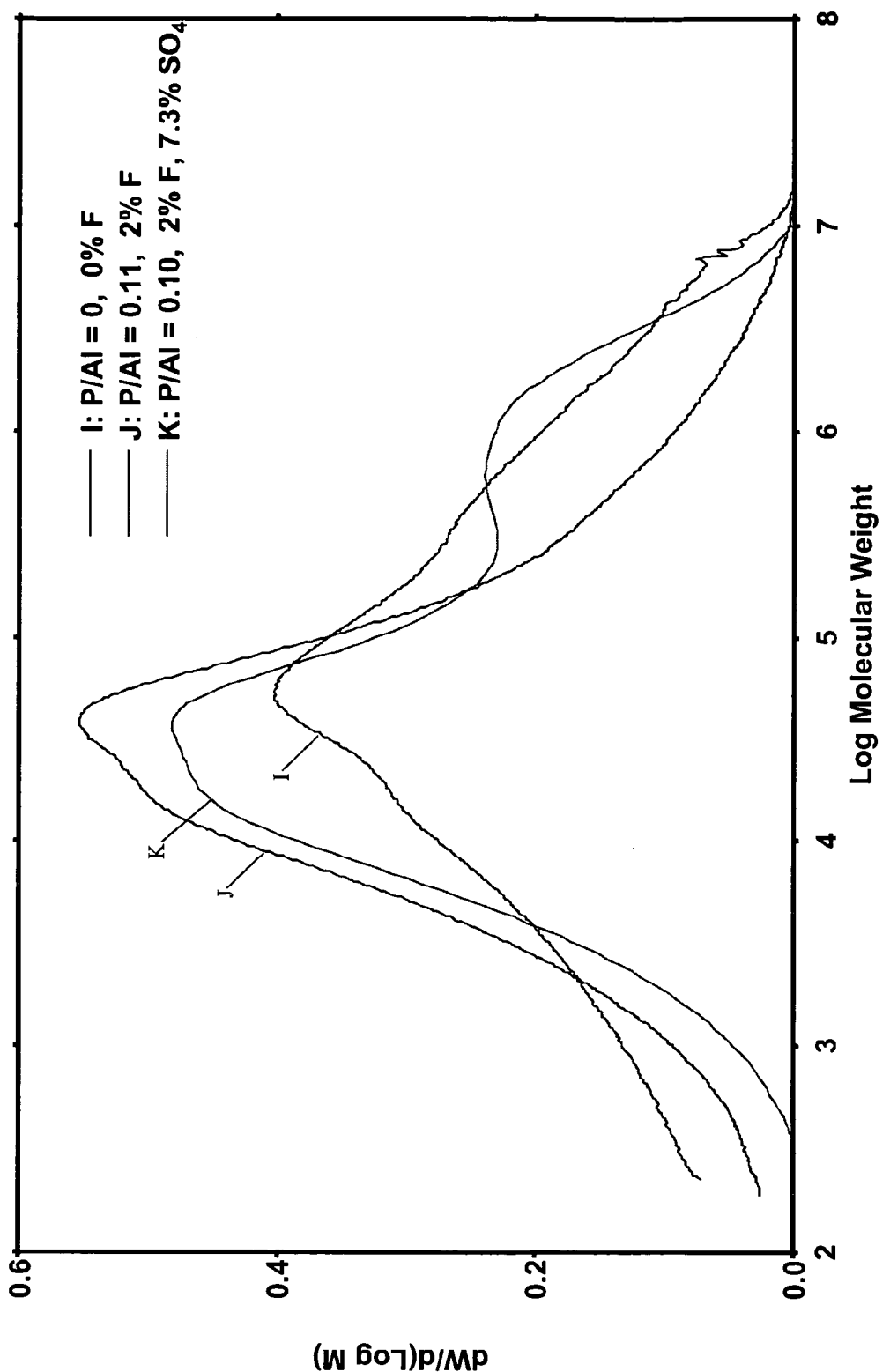
Figure 9:
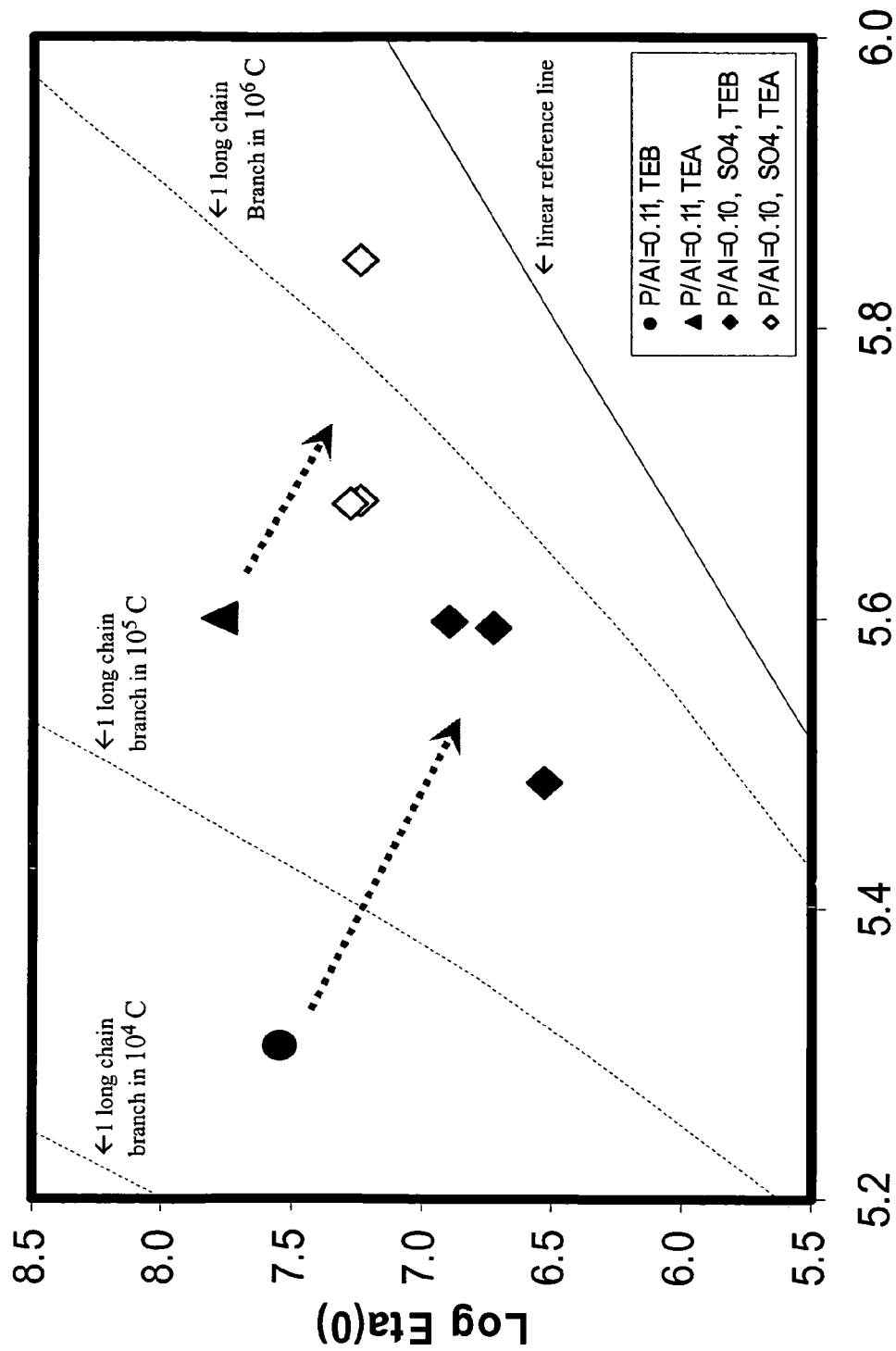
FIG. 9 depicts an Arnett plot of molecular weight distributions of polyethylene resins formed using chromium/aluminophosphate catalysts treated with sulfate and not treated with sulfate.

The properties of the polymers produced are shown in Tables 4 and 5. One can see in Table 4 that both the $M_W/M_N$ and $M_Z/M_W$ values were narrowed by the addition of sulfate. To see this effect one must perform the polymerizations at the same activation temperature (600° C.), with the same cocatalyst (TEA vs. TEB) and at the same level of phosphate, since each of these variables contributes to the breadth of the molecular weight distribution. When that comparison is made one can see that sulfate does have the effect of narrowing the molecular weight distribution by diminishing both the high and low molecular weight tails. Thus, both the $M_W/M_N$ and $M_Z/M_W$ values are lower for the sulfated samples. FIGS. 7 and 8 show the molecular weight distribution, curves, which make this effect abundantly clear. FIG. 9 shows an Arnett plot of this same data, which demonstrates that the sulfate tends to make the polymer more linear. In each series (TEA and TEB), the addition of sulfate causes the points to move closer to the Arnett line, indicating increasing linearity.

TABLE 4

| Run # | P/Al | % F | % SO$_4$ | Act. Temp. | Co-Catalyst | Activity | HLMI | Mn/1000 | Mw/1000 | Mz/1000 | Mw/Mn | Mz/Mw |
|---|---|---|---|---|---|---|---|---|---|---|---|---|
| | | | | | | Sulfated | | | | | | |
| 1 | 0.10 | 2 | 7.3 | 400° C. | TEB | 1683 | 8.0 | 10.68 | 391.8 | 2741.9 | 36.7 | 7.0 |
| 2 | 0.10 | 2 | 7.3 | 400° C. | TEA | 1341 | 0.2 | 32.08 | 479 | 2236.3 | 14.9 | 4.7 |
| 3 | 0.10 | 2 | 7.3 | 600° C. | TEB | 959 | 6.5 | 12.14 | 397 | 2512 | 32.7 | 6.3 |
| 4 | 0.10 | 2 | 7.3 | 600° C. | TEA | 520 | 0.3 | 26.64 | 701.28 | 2721.5 | 26.3 | 3.9 |
| 5 | 0.10 | 2 | 7.3 | 750° C. | TEB | 1636 | 22.3 | 4.79 | 307.51 | 2469.8 | 64.2 | 8.0 |
| 6 | 0.10 | 2 | 7.3 | 750° C. | TEA | 1668 | 0.6 | 31.67 | 478.14 | 2233.7 | 15.1 | 4.7 |
| | | | | | | Not Sulfated | | | | | | |
| 7 | 0 | 0 | 0 | 600° C. | TEB | 1074 | 4.7 | 4.39 | 459.08 | 3603.43 | 104.6 | 7.8 |
| 8 | 0.11 | 2 | 0 | 600° C. | TEB | 1636 | 50.5 | 6.09 | 202.77 | 2956.45 | 33.3 | 14.6 |
| 9 | 0.11 | 2 | 0 | 600° C. | TEA | 882 | 4.5 | 5.01 | 398.17 | 3768.54 | 79.5 | 9.5 |
| 10 | 0 | 0 | 0 | 600° C. | TEA | 559 | 0.7 | 6.25 | 720.12 | 5221.44 | 115.2 | 7.3 |
| 11 | 0 | 2 | 0 | 600° C. | TEA | 634 | 0.0 | 7.79 | 887.56 | 3932.04 | 113.9 | 4.4 |
| 12 | 0 | 10 | 0 | 600° C. | TEA | 205 | 0.3 | 8.47 | 756.55 | 3809.53 | 89.3 | 5.0 |
| 13 | 0.04 | 2.7 | 0 | 600° C. | TEA | 1168 | 0.3 | 5.86 | 670.59 | 3690.24 | 114.4 | 5.5 |
| 14 | 0.04 | 2.7 | 0 | 600° C. | TEA | 1406 | 0.6 | 7.98 | 626.58 | 3688.54 | 78.5 | 5.9 |

TABLE 5

| Run # | P/Al | % F | % SO$_4$ | Act. Temp. | Co-Catalyst | Activity | HLMI | Mn/1000 | Mw/1000 | Mz/1000 | Mw/Mn | Mz/Mw |
|---|---|---|---|---|---|---|---|---|---|---|---|---|
| | | | | | | Sulfated | | | | | | |
| 15 | 0.10 | 2 | 7.3 | 400 C. | TEB | 1683 | 8.0 | 10.68 | 391.8 | 2741.9 | 36.7 | 7.0 |
| 16 | 0.10 | 2 | 7.3 | 400 C. | TEA | 1341 | 0.2 | 32.08 | 479 | 2236.3 | 14.9 | 4.7 |
| 17 | 0.10 | 2 | 7.3 | 600 C. | TEB | 959 | 6.5 | 12.14 | 397 | 2512 | 32.7 | 6.3 |
| 18 | 0.10 | 2 | 7.3 | 600 C. | TEA | 520 | 0.3 | 26.64 | 701.28 | 2721.5 | 26.3 | 3.9 |
| 19 | 0.10 | 2 | 7.3 | 750 C. | TEB | 1636 | 22.3 | 4.79 | 307.51 | 2469.8 | 64.2 | 8.0 |
| 20 | 0.10 | 2 | 7.3 | 750 C. | TEA | 1668 | 0.6 | 31.67 | 478.14 | 2233.7 | 15.1 | 4.7 |
| | | | | | | Not Sulfated | | | | | | |
| 21 | 0 | 0 | 0 | 600 C. | TEB | 1074 | 4.7 | 4.39 | 459.08 | 3603.43 | 104.6 | 7.8 |
| 22 | 0.11 | 2 | 0 | 600 C. | TEB | 1636 | 50.5 | 6.09 | 202.77 | 2956.45 | 33.3 | 14.6 |
| 23 | 0.11 | 2 | 0 | 600 C. | TEA | 882 | 4.5 | 5.01 | 398.17 | 3768.54 | 79.5 | 9.5 |
| 24 | 0 | 0 | 0 | 600 C. | TEA | 559 | 0.7 | 6.25 | 720.12 | 5221.44 | 115.2 | 7.3 |
| 25 | 0 | 2 | 0 | 600 C. | TEA | 634 | 0.0 | 7.79 | 887.56 | 3932.04 | 113.9 | 4.4 |
| 26 | 0 | 10 | 0 | 600 C. | TEA | 205 | 0.3 | 8.47 | 756.55 | 3809.53 | 89.3 | 5.0 |
| 27 | 0.04 | 2.7 | 0 | 600 C. | TEA | 1168 | 0.3 | 5.86 | 670.59 | 3690.24 | 114.4 | 5.5 |
| 28 | 0.04 | 2.7 | 0 | 600 C. | TEA | 1406 | 0.6 | 7.98 | 626.58 | 3688.54 | 78.5 | 5.9 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymer composition having a PDI in a range of from about 6 to about 15, a weight average molecular weight $M_W$ greater than about 300,000 g/mol, and an $E_o$ less than about $1 \times 10^6$ Pa·s.

2. The polymer composition of claim 1, wherein the $E_o$ is less than about $5 \times 10^5$ Pa·s.

3. The polymer composition of claim 1, wherein the $M_W$ is greater than about 400,000 g/mol.

4. The polymer composition of claim 3, wherein the $E_o$ is less than about $5 \times 10^5$ Pa·s.

5. The polymer composition of claim 1, comprising polyethylene, copolymers of polyethylene with mono-olefins having from about 3 to about 8 carbon atoms, or combinations thereof.

6. A polymer composition having a PDI in a range of from about 6 to about 15, a weight average molecular weight $M_W$ greater than about 500,000 g/mol, and an $E_o$ less than about $5 \times 10^6$ Pa·s.

7. The polymer composition of claim 6, comprising polyethylene, copolymers of polyethylene with mono-olefins having from about 3 to about 8 carbon atoms, or combinations thereof.

8. A polymer composition having a PDI in a range of from about 6 to about 15, a weight average molecular weight $M_W$ greater than about 300,000 g/mol and a relaxation time less than about 10 seconds.

9. The polymer composition of claim 8, wherein the relaxation time is less than about 5 seconds.

10. The polymer composition of claim 8, wherein the $M_W$ is greater than about 400,000 g/mol.

11. The polymer composition of claim 9, wherein the $M_W$ is greater than about 400,000 g/mol.

12. The polymer composition of claim 8, wherein the $M_W$ is greater than about 500,000 g/mol.

13. The polymer composition of claim 8, comprising polyethylene, copolymers of polyethylene with mono-olefins having from about 3 to about 8 carbon atoms, or combinations thereof.

14. A polymer composition having a PDI in a range of from about 6 to about 15, a weight average molecular weight $M_W$ greater than about 300,000 g/mol, and a rheological breadth parameter, "a" greater than about 0.30.

15. The polymer composition of claim 14, wherein the $M_W$ is greater than about 500,000 g/mol.

16. The polymer composition of claim 14, wherein the rheological breadth is greater than about 0.35.

17. The polymer composition of claim 16, wherein the $M_W$ is greater than about 500,000 g/mol.

18. The polymer composition of claim 14, comprising polyethylene, copolymers of polyethylene with mono-olefins having from about 3 to about 8 carbon atoms, or combinations thereof.

19. A polymer composition comprising polyethylene and having a PDI in a range of from about 6 to about 15, a HLMI less than about 5 g/10 min, and an $E_o$ less than about $1 \times 10^6$ Pa·s.

20. The polymer composition of claim 19, wherein the $E_o$ is less than about $5 \times 10^5$ Pa·s.

21. The polymer composition of claim 19, wherein the HLMI is less than about 3 g/10 min.

22. The polymer composition of claim 20, wherein the HLMI is less than about 3 g/10 min.

23. The polymer composition of claim 19, wherein the polyethylene comprises copolymers of polyethylene with mono-olefins having from about 3 to about 8 carbon atoms.

24. A polymer composition comprising polyethylene and having a PDI in a range of from about 6 to about 15, a HLMI less than about 2 g/10 min, and an $E_o$ less than about $5 \times 10^6$ Pa·s.

25. The polymer composition of claim 24, wherein the $E_o$ is less than about $1 \times 10^6$ Pa·s.

26. The polymer composition of claim 24, wherein the $E_o$ is less than about $5 \times 10^5$ Pa·s.

27. The polymer composition of claim 24, wherein the polyethylene comprises copolymers of polyethylene with mono-olefins having from about 3 to about 8 carbon atoms.

28. An article of manufacture comprising the polymer composition of claim 1.

29. The article of manufacture of claim 28, comprising an extruded article, an injection molded article, a thermoformed article, a fiber, a cast article, or combinations thereof.

* * * * *